(12) United States Patent
Steffan et al.

(10) Patent No.: US 12,253,471 B2
(45) Date of Patent: Mar. 18, 2025

(54) SURFACE DEFECT MONITORING SYSTEM

(71) Applicant: Pave-AI Inc., Olathe, KS (US)

(72) Inventors: Scott Steffan, Hamburg, NY (US); Constantine Papageorgiou, Needham, MA (US); Amit Mehra, Arlington, VA (US)

(73) Assignee: Terracon Consultants, Inc., Olathe, KS (US)

( * ) Notice: Subject to any disclaimer, the term of this patent is extended or adjusted under 35 U.S.C. 154(b) by 208 days.

(21) Appl. No.: 17/493,342

(22) Filed: Oct. 4, 2021

(65) Prior Publication Data
US 2022/0373473 A1 Nov. 24, 2022

Related U.S. Application Data

(60) Provisional application No. 63/087,529, filed on Oct. 5, 2020.

(51) Int. Cl.
*G01N 21/88* (2006.01)
*G06T 7/00* (2017.01)

(52) U.S. Cl.
CPC ....... *G01N 21/8851* (2013.01); *G06T 7/0002* (2013.01); *G01N 2021/8861* (2013.01);
(Continued)

(58) Field of Classification Search
CPC ....... G01N 21/8851; G01N 2021/8861; G01N 2021/8874; G01N 2021/8877; G01N 2021/888; G01N 2021/889; G01N 2021/8887; G06T 7/0002; G06T 2207/10004; G06T 2207/10024;
(Continued)

(56) References Cited

U.S. PATENT DOCUMENTS 6,470,265 B1 * 10/2002 Tanaka ............... G01C 21/3852
701/532
10,803,613 B2 * 10/2020 Porter .................. G06T 7/0002
(Continued)

FOREIGN PATENT DOCUMENTS

WO WO-2018104700 A1 * 6/2018 ........... G06T 3/4038

*Primary Examiner* — Brandon J Miller
(74) *Attorney, Agent, or Firm* — Stinson LLP

(57) ABSTRACT

A system for taking high-resolution photographs from a vehicle-mounted camera, forming orthomosaics from video and/or multiple high-resolution photographs, and using artificial intelligence to detect and classify pavement flaws and defects in the imagery. Detection also includes the ability to capture quantifiable metrics for the defects and/or a region of interest. Three-dimensional imagery is produced from the same images as the orthomosaics. Surface and terrain map products made from the same source images capture additional details such as depth and volume. The highlighted orthomosaics and three-dimensional imagery can then be used as a basis to determine the pavement surface condition and subsequently support maintenance orders and manage pavement repairs. Further, metadata such as latitude, longitude, and altitude geo-location coordinates and sampling time can also be transferred to the output products to create a digital time history and enable analysis for preventative maintenance planning. Alternatively-sourced imagery may also be analyzed.

20 Claims, 10 Drawing Sheets

(52) U.S. Cl.
CPC .............. *G01N 2021/8874* (2013.01); *G01N 2021/8877* (2013.01); *G01N 2021/888* (2013.01); *G01N 2021/889* (2013.01); *G06T 2207/10004* (2013.01)

(58) Field of Classification Search
CPC . G06T 2207/10028; G06T 2207/30784; G06T 2207/30252; G06T 7/0004; G06T 2207/30184
See application file for complete search history.

(56) References Cited

U.S. PATENT DOCUMENTS

2008/0221843 A1* 9/2008 Shenkar .................. G06T 17/05 703/1
2021/0350524 A1* 11/2021 Bishop ................... G06T 7/001

\* cited by examiner

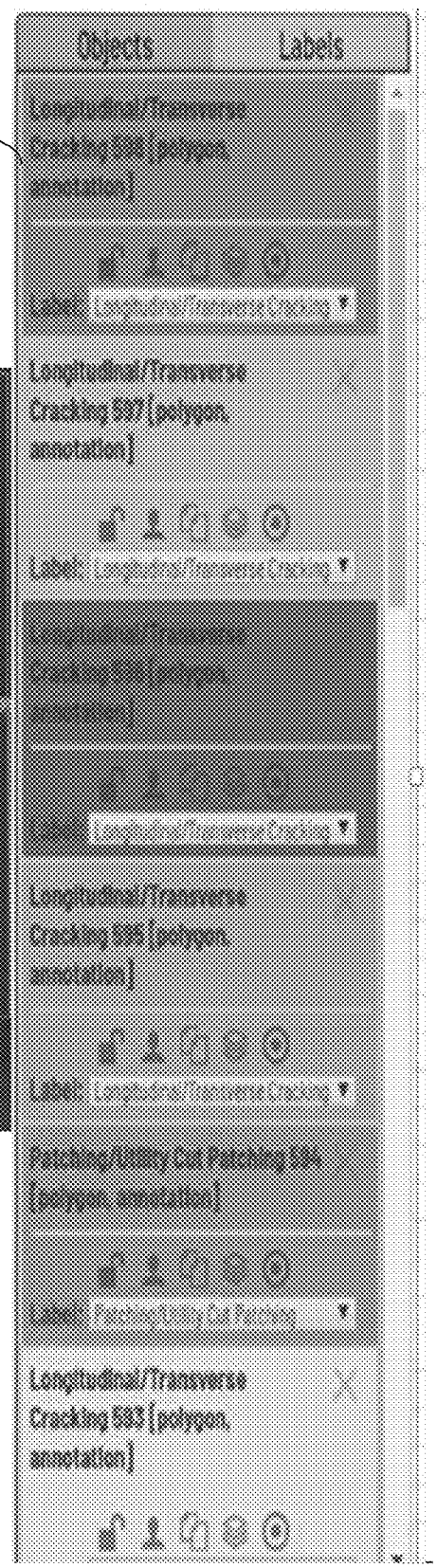
FIG. 12A
FIG. 12B

SURFACE DEFECT MONITORING SYSTEM

RELATIONSHIP TO OTHER APPLICATIONS

This application claims the benefit of U.S. provisional patent application Ser. No. 63/087,529 filed Oct. 5, 2020 to the same inventors.

GOVERNMENT RIGHTS

This invention was made with Government support under Contract No. FA9453-20-C-0536, awarded by the Government. The Government has certain rights in the invention.

FIELD OF ART

The present invention relates to a surface defect monitoring system. The present invention more particularly relates to such a system that operates from a land vehicle and provides two-dimensional and three-dimensional results, including surface and terrain maps that can be used for identification and surface/depth measurement of surface defects.

The general capability can also be extended to other infrastructure elements such as airfields, bridges, railroad tracks, roof and building inspection, foreign object debris, etc.

BACKGROUND OF THE INVENTION

Pavement monitoring systems have been developed for analyzing pavement defects by imaging the pavement to detect defects. Drones and satellites have proven less than ideal for the job, as tree canopies and other overhangs can prevent full imaging, image resolution is limited, and the capital equipment and expertise required results in significant costs.

An orthomosaic is a photogrammetrically orthorectified image product mosaicked from an image collection, where the geometric distortion has been corrected and the imagery has been color balanced to produce a seamless mosaic dataset. The orthomosaic, as well as the raw native imagery, can be analyzed using a variety of image processing and machine learning algorithms to automatically detect and measure defects, and automatically calculate relevant metrics such as a Pavement Condition Index (PCI), or other health or condition ratings for the imaged area.

SUMMARY OF THE INVENTION

The present invention provides a system for taking multiple high-resolution photographs from a camera mounted on a ground based/land vehicle. This video or photographic imagery is processed and used to form ortho-rectified imagery that can be combined into larger orthomosaics. This imagery can then be used for visual interpretation, as well as input to support the use of artificial intelligence to detect and classify pavement flaws and defects in the orthomosaic imagery. Detection also includes the ability to capture items such as severity, length, area, and other quantifiable metrics for the defects and/or a region of interest, including the generation of three-dimensional imagery and surface and terrain map products to capture additional details such as depth and volume. The highlighted orthomosaics and other three-dimensional imagery can then be used as a basis for remotely assessing pavement condition, as well as quoting and managing repair, maintenance, and replacement efforts without the need for on-site inspections. Further, metadata such as latitude, longitude, and altitude geo-location coordinates and sampling time can also be transferred to the orthomosaics to create a digital time history and enable analysis for preventative maintenance planning. The imagery analysis capability of the system can also be used to analyze a wide variety of imagery inputs, including but not limited to: manually collected, land vehicle collected, drone, and satellite imagery of adequate resolution.

DESCRIPTION OF THE FIGURES OF THE DRAWINGS

The present invention will hereinafter be described in conjunction with the following drawing figures, wherein like numerals denote like elements, the hundreds digit(s) of the reference numerals indicate the figure number in which the element is first identified.

FIG. 12A is a screen shot view illustrating an exemplary embodiment of the output of the exemplary defect detection and analysis facility, as produced by the surface defect monitoring system of FIG. 1, according to a preferred embodiment of the present invention;

FIG. 12B is a screen shot view illustrating an exemplary embodiment of the output of the exemplary defect detection and analysis facility, as produced by the surface defect monitoring system of FIG. 1, and corresponding in color to the polygons in FIG. 12A, according to a preferred embodiment of the present invention;

DETAILED DESCRIPTION OF THE INVENTION

Figure 1:
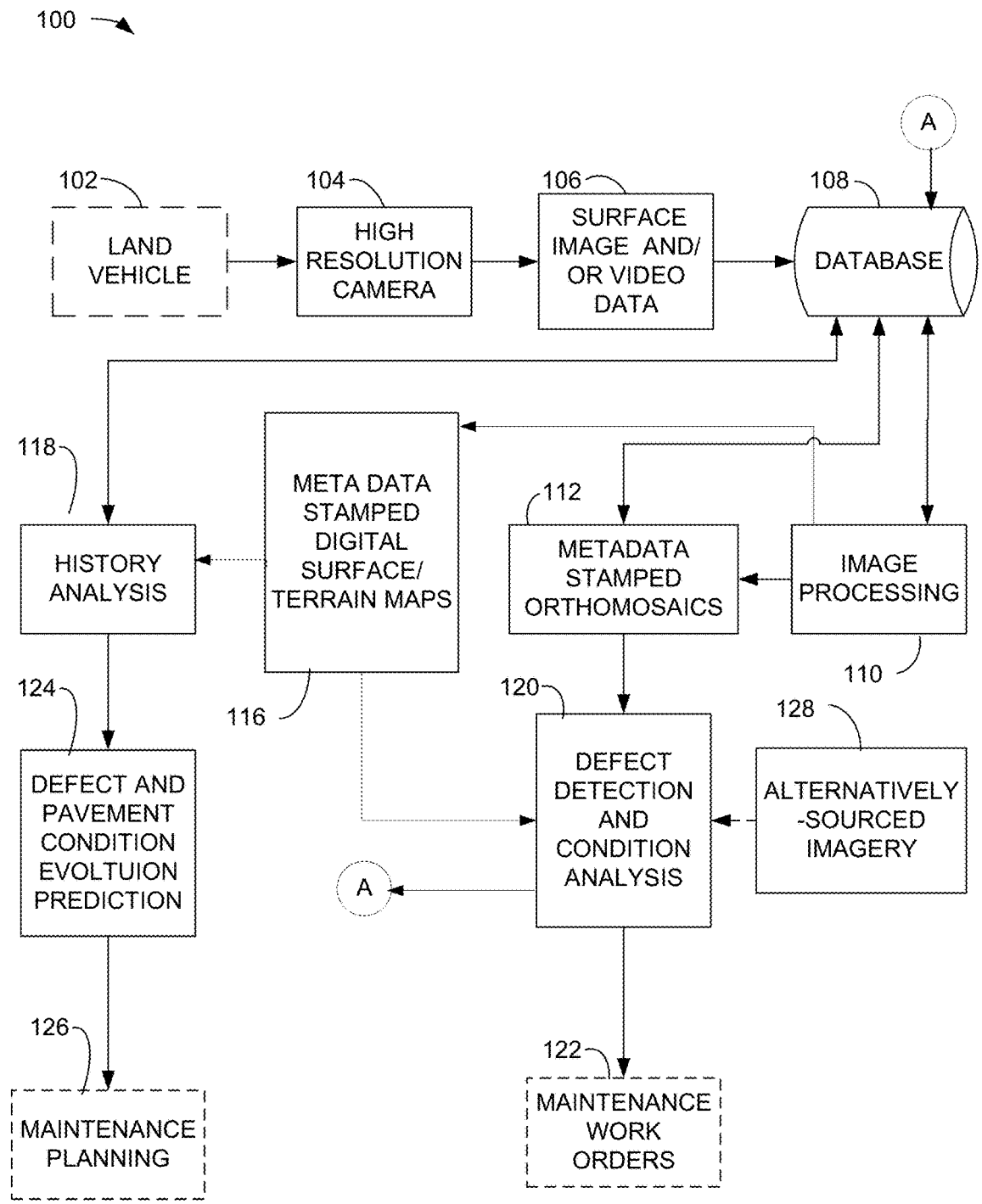
FIG. 1 is a diagrammatic view illustrating an exemplary embodiment of a surface defect monitoring system, according to a preferred embodiment of the present invention.

As used and defined herein the term "alternatively-sourced" refers to imagery obtained by means other then the high resolution camera shown in FIGS. 1 and 2. Specifically, alternatively-sourced imagery may be provided from cameras mounted on aircraft (drones, UAVs, piloted airplanes, helicopters, balloons, etc.), spacecraft, and special vehicles such as hovercraft. The alternatively-sourced imagery must be of sufficiently high resolution to support analysis by the present invention.

FIG. 1 is a diagrammatic view illustrating an exemplary embodiment of a surface defect monitoring system 100, according to a preferred embodiment of the present invention. System 100 uses land vehicle 102 to support an attached high-resolution digital camera 104 that is positioned and oriented to photograph pavement within view from the land vehicle in front or behind the land vehicle 102. While the land vehicle 102 is presented in this embodiment, other vehicles 102 may be used in various other embodiments. For example, imagery from aircraft, including drones, helicopters, hovercraft, as well as spacecraft/satellites may be used in respective various embodiments. The high-resolution digital camera 104 may be releasably attached or fixed to the land vehicle 102. The high-resolution digital camera 104 may be mounted on the front or the rear of the vehicle 102, responsive to operational circumstances. The high-resolution digital camera 104 collects image data of the pavement surface which is subsequently stored in database 108. Communication between the camera 104 and the database 108 may be wireless or hardwired. In a particular embodiment, the database 108 may be integral with the camera 102, in the form of a hard drive. The hard drive may be removable. In some embodiments, the database 108 may be a plurality of distributed databases. The image processing facility 110 retrieves image data from the database 108 and produces orthomosaics 112 with associated metadata such as, but not limited to, time stamps and latitude/longitude/altitude geo-location coordinates, which are also stored in database 108. Digital surface and terrain maps 116 are also produced from the image processing facility 110 and also can be sent to the history analysis 118 facility, to the defect detection and analysis facility 120, and onward to database 108.

The defect detection and analysis facility 120 receives orthomosaics 112 and digital surface and terrain maps 116 and uses an artificial intelligence engine to analyze various kinds of defects in the pavement surface and superimpose upon the orthomosaic 112 respective various indicators of the defects. For example, color-coded polygons may be used to form perimeters around defects such as but not limited to potholes, sunken grates, patching, alligator cracking, longitudinal cracking, transverse cracking, etc. Shading and fill may be used with or without perimeters to indicate defects. The color coding may also indicate the seriousness of the pavement defect. From that analysis, pavement quality or condition assessments, repair and maintenance assessments, and quotations or work orders 122 may be generated. Outputs of the defect detection and analysis facility 120 are stored in database 108 and so are also available to the history analysis facility 118.

In some embodiments, the defect detection and analysis facility 120 receives alternatively-sourced imagery 128 and uses the artificial intelligence engine to analyze various kinds of defects in the pavement surface and superimpose upon the alternatively sourced imagery 128 respective various indicators of the defects.

The history analysis facility 118 compares metadata and imagery 106, orthomosaics 112, and depth/terrain maps 116, having various reference time stamps and/or other reference data such as but not limited to temperature, rainfall, snowfall, etc. to identify evolving pavement defects, which are used by an artificial intelligence engine to predict 124 life, degradation and an optimum and evolving maintenance approach. The predictions from the defect evolution prediction facility 124 may be used for longer term maintenance planning 126.

Figure 2A:
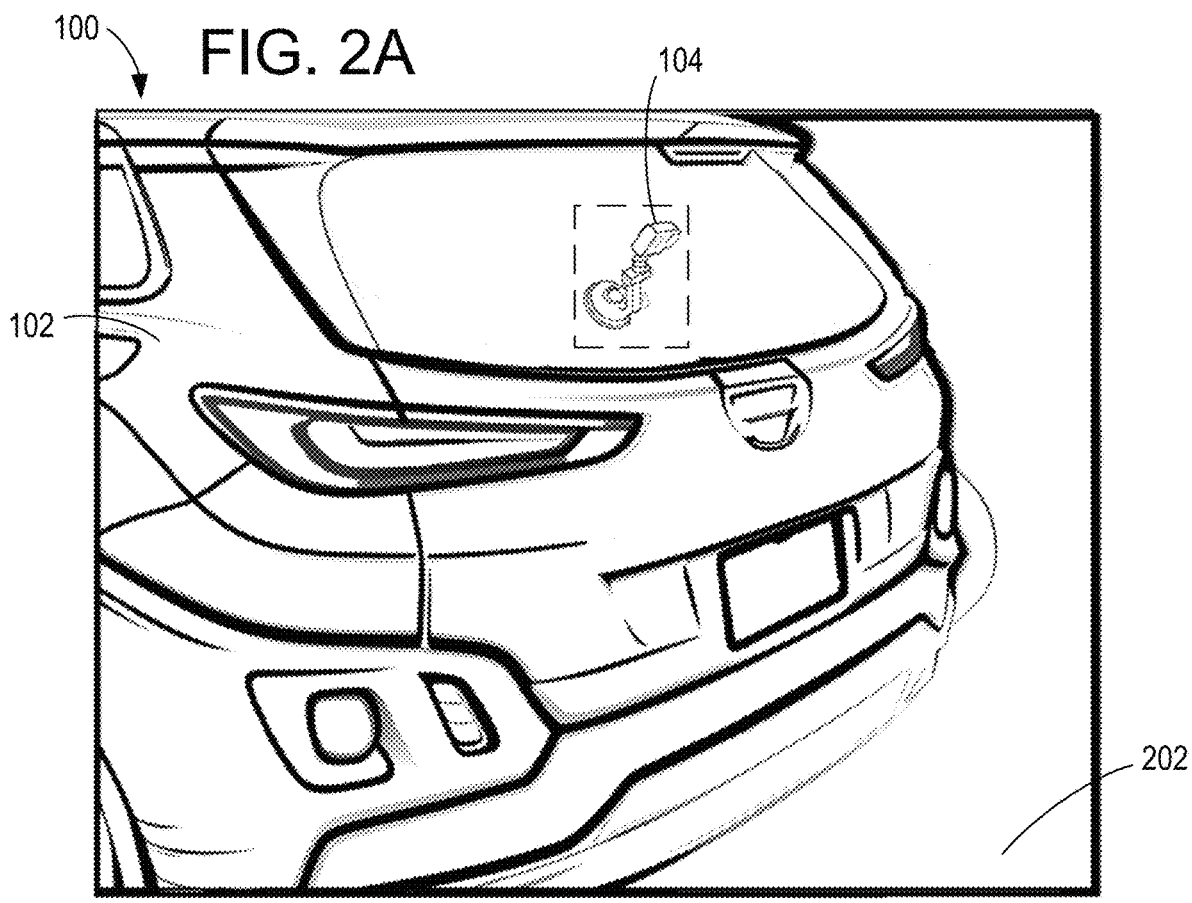
FIG. 2A is a simplified line drawing illustrating an exemplary embodiment of an exemplary land vehicle and an exemplary attached high-resolution camera of the exemplary surface defect monitoring system of FIG. 1, with a rectangular area framed for enlargement according to a preferred embodiment of the present invention.
Figure 2B:
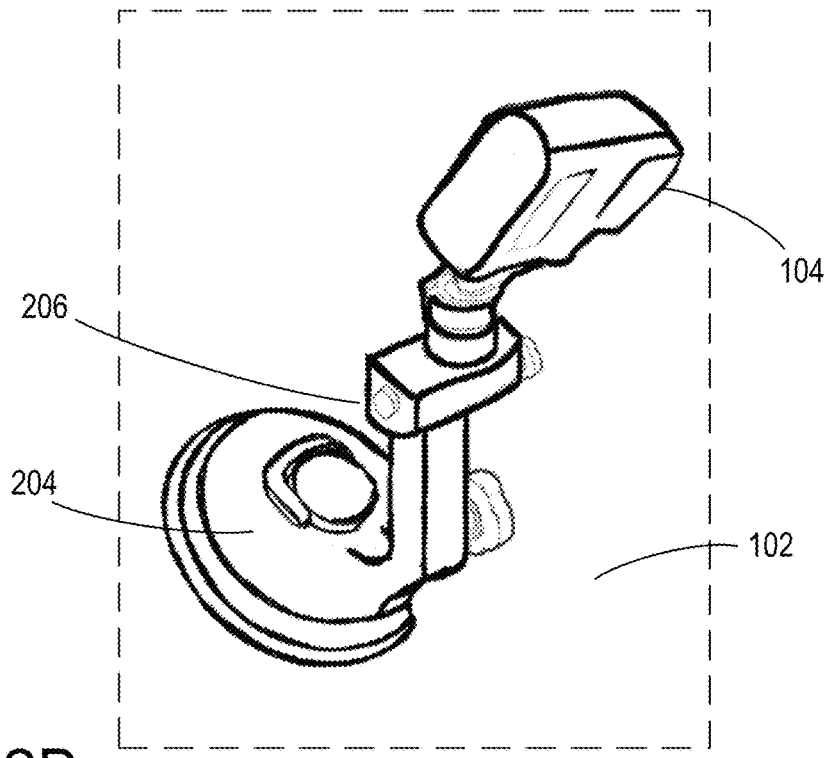
FIG. 2B is a simplified line drawing illustrating an exemplary embodiment of an exemplary attached high-resolution camera of the exemplary surface defect monitoring system of FIG. 1, and showing an enlargement of the framed rectangular area identified in FIG. 2A, according to a preferred embodiment of the present invention.

FIG. 2A is a simplified line drawing illustrating an exemplary embodiment of an exemplary land vehicle 102 and an exemplary attached high-resolution camera 104 of the exemplary surface defect monitoring system 100 of FIG. 1, with a rectangular area framed for enlargement according to a preferred embodiment of the present invention. Land vehicle 102 may be any of various types of cars, vans, tricycles, bicycles, hand carts, and the like, and having a mounting area on the land vehicle 102 for mounting the high-resolution digital camera 104 in a position to view pavement 202. As shown in the detailed view, high-resolution digital camera 104 attaches to land vehicle 102 via a suction cup base 204 and an articulatable arm 206. Those of skill in the art, enlightened by the present disclosure, will be aware of the variety of methods for mounting a camera on a portion of a land vehicle 102. The high-resolution camera 104 may be mounted on the front or the rear of the land vehicle 102. FIG. 2B is a simplified line drawing illustrating an exemplary embodiment of an exemplary attached high-resolution camera of the exemplary surface defect monitoring system of FIG. 1, and showing an enlargement of the framed rectangular area identified in FIG. 2A, according to a preferred embodiment of the present invention. High-resolution digital camera 104 attaches to land vehicle 102 via a suction cup base 204 and an articulatable arm 206.

Figure 3:
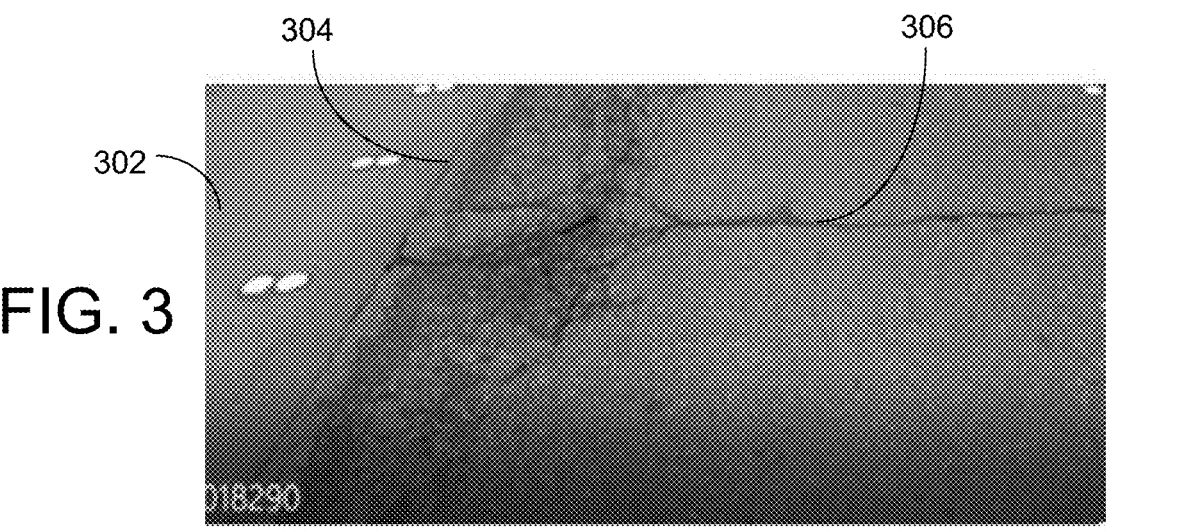
FIG. 3 is a photographic view illustrating an exemplary embodiment of a photograph of pavement, showing exemplary longitudinal and transverse cracking, taken by the high-resolution camera of the exemplary surface defect monitoring system of FIG. 1, according to a preferred embodiment of the present invention.

FIG. 3 is a photographic view illustrating an exemplary embodiment of a photograph of pavement 302, showing exemplary longitudinal cracking 304 and transverse cracking 306, taken by the high-resolution digital camera 104 of the exemplary surface defect monitoring system 100 of FIG. 1, according to a preferred embodiment of the present invention. The resolution for the high-resolution digital camera 104 ranges from one centimeter per pixel to less than one millimeter per pixel. By comparison, aircraft drone images have a resolution of about three centimeters per pixel and commercial satellite imagery has a resolution of about thirty centimeters per pixel.

Figure 4:
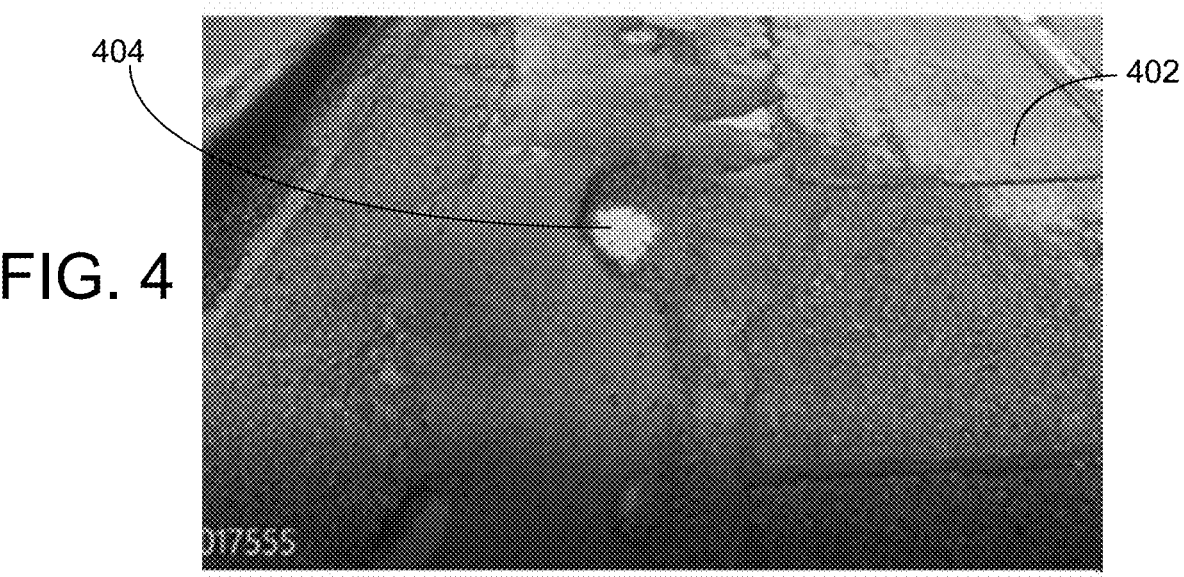
FIG. 4 is a photographic view illustrating an exemplary embodiment of a photograph of pavement, showing an exemplary pothole, taken by the high-resolution camera of the exemplary surface defect monitoring system of FIG. 1, according to a preferred embodiment of the present invention.

FIG. 4 is a photographic view illustrating an exemplary embodiment of a photograph of pavement 402, showing an exemplary pot hole 404, taken by the high-resolution digital camera 104 of the exemplary surface defect monitoring system 100 of FIG. 1, according to a preferred embodiment of the present invention. One pothole of three visible potholes 404 is labeled.

Figure 5:
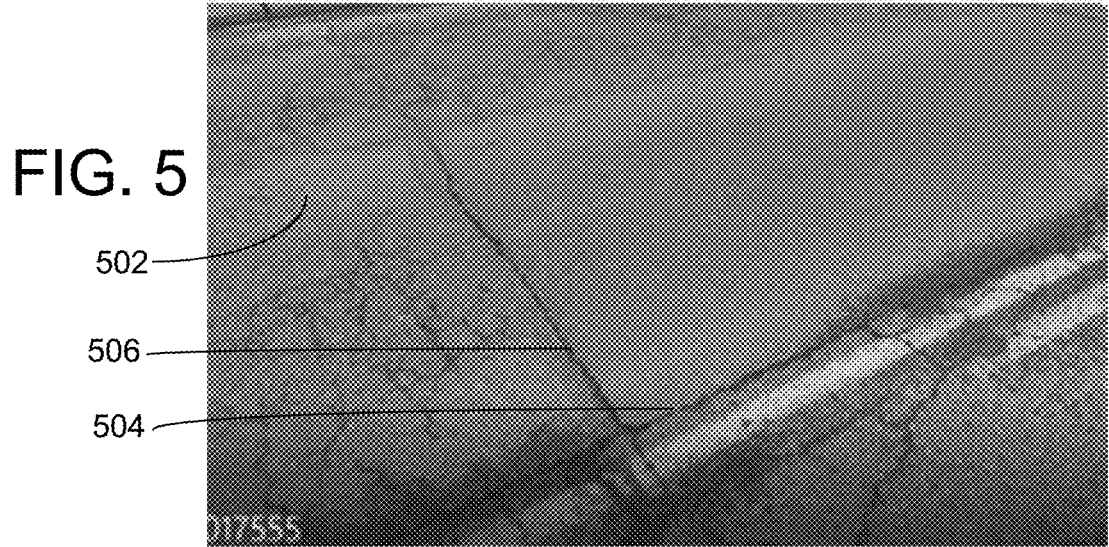
FIG. 5 is a photographic view illustrating an exemplary embodiment of a photograph of pavement, showing exemplary longitudinal and transverse cracking, taken by the high-resolution camera of the exemplary surface defect monitoring system of FIG. 1, according to a preferred embodiment of the present invention.

FIG. 5 is a photographic view illustrating an exemplary embodiment of another photograph of pavement 502, showing exemplary longitudinal cracking 504 and transverse cracking 506, taken by the high-resolution digital camera 104 of the exemplary surface defect monitoring system 100 of FIG. 1, according to a preferred embodiment of the present invention.

Figure 6:
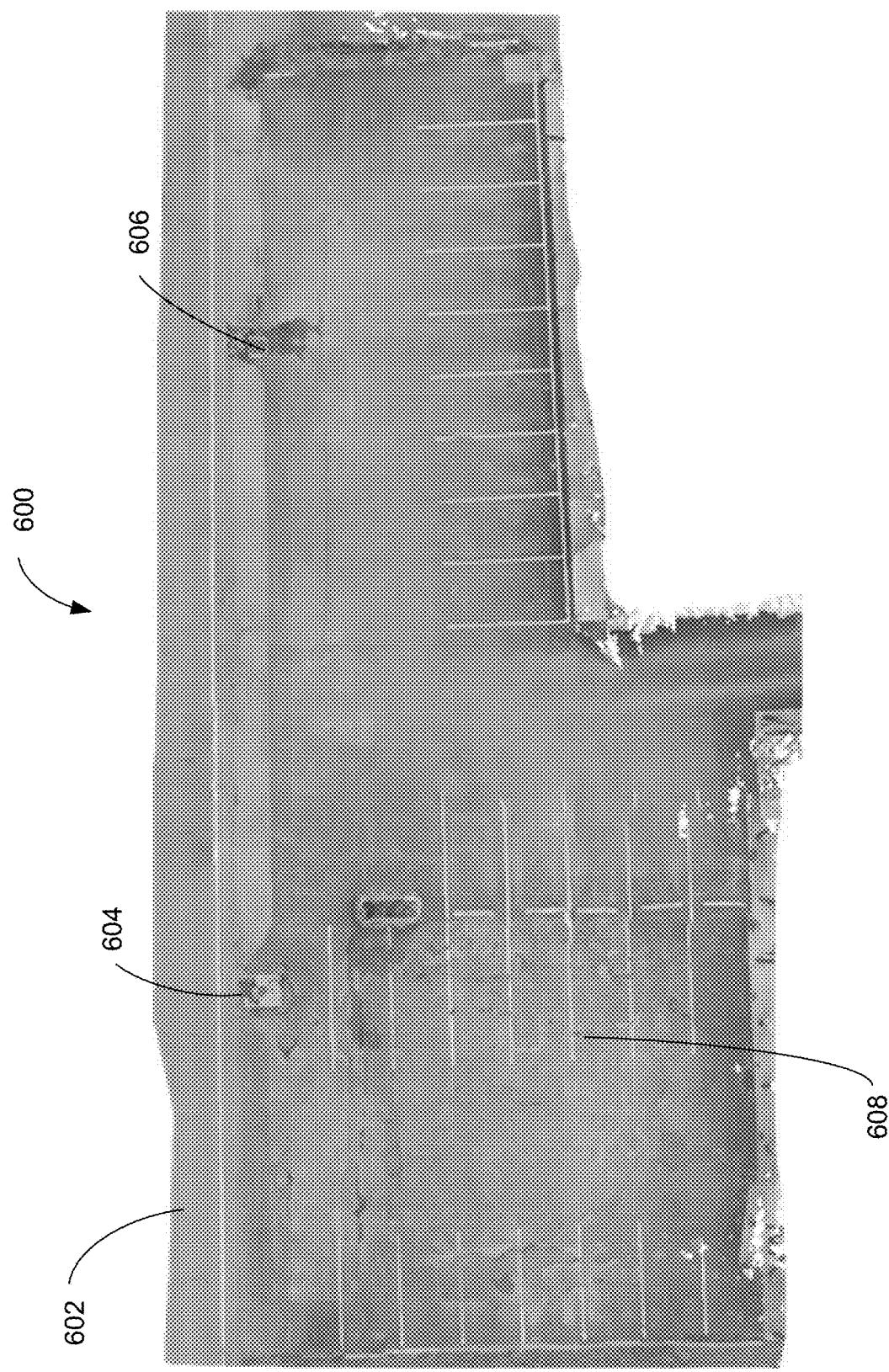
FIG. 6 is a top plan exploded view illustrating an exemplary embodiment of an orthomosaic produced by the surface defect monitoring system of FIG. 1, according to a preferred embodiment of the present invention.

FIG. 6 is a top plan detailed view illustrating an exemplary embodiment of an orthomosaic 600 of pavement 602 produced by the surface defect monitoring system 100 of FIG. 1, according to a preferred embodiment of the present invention. Three areas of interest have been indicated by the defect detection and analysis facility 120. Defect image 604 shows a cracked and broken concrete utility seal. Defect image 606 shows pavement damage around a sewer grating. Defect image 608 shows a small pothole.

Figure 7:
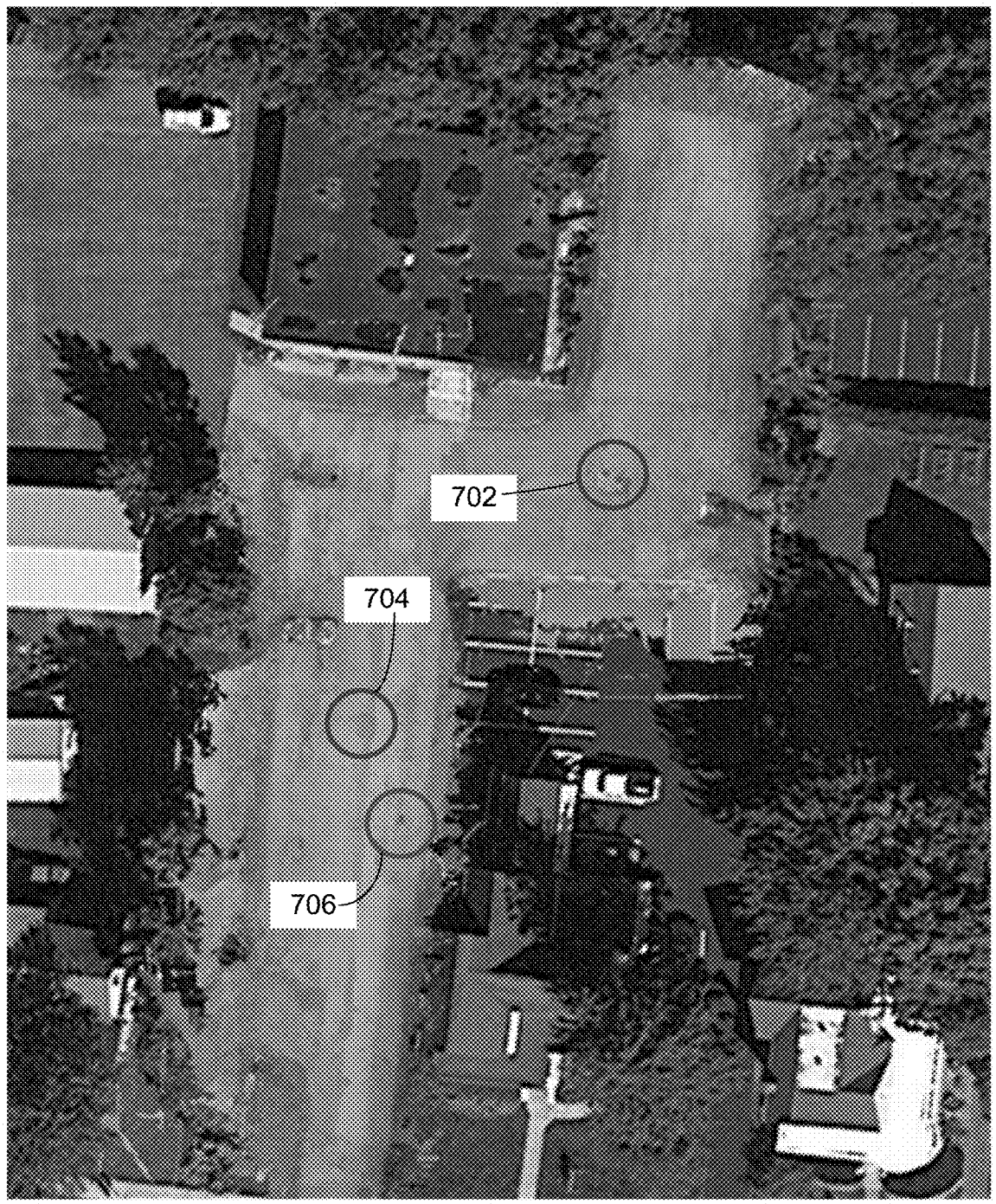
FIG. 7 is a top plan view illustrating an exemplary embodiment of a processed high-resolution, metadata-stamped orthomosaic of the surface defect monitoring system of FIG. 1, overlaid on a background satellite image, according to a preferred embodiment of the present invention.

FIG. 7 is a top plan view illustrating an exemplary embodiment of a processed high-resolution, metadata-stamped orthomosaic 112, of the surface defect monitoring system 100 of FIG. 1, overlaid on background satellite image 700, according to a preferred embodiment of the present invention. Pavement defect 702 is a pothole with debris and is identified by a red circle. Pavement defect 704 is a cracked and failing asphalt patch and is identified by a red circle. Pavement defect 706 is a minor pothole and is identified with a blue circle.

Figure 8A:
FIG. 8A is a top plan enlarged view illustrating an exemplary embodiment of an image of a pavement defect of FIG. 7 produced by the surface defect monitoring system of FIG. 1, according to a preferred embodiment of the present invention.

FIG. 8A is a top plan view illustrating an exemplary embodiment of an image of a pavement defect 702 of FIG. 7 produced by the surface defect monitoring system 100 of FIG. 1, according to a preferred embodiment of the present invention. Debris including fragmented pavement has accumulated in pothole sections of the pavement defect 702 and severe cracking of the lighter-colored pavement indicates an evolving problem to be flagged to the history analysis facility 118.

Figure 8B:
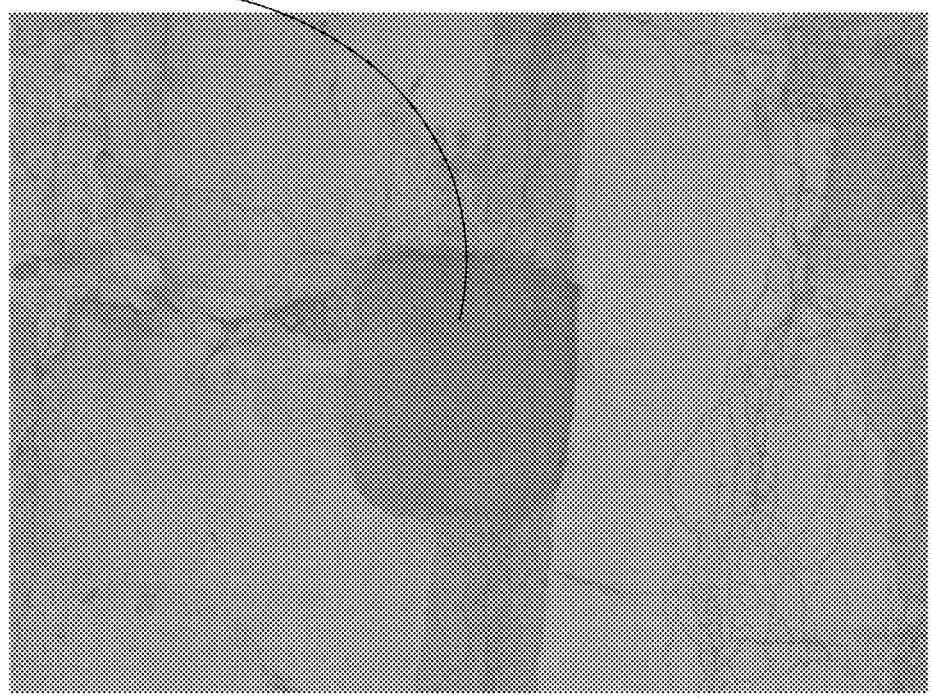
FIG. 8B is a top plan view illustrating an exemplary embodiment of an image of another pavement defect of FIG. 7 produced by the surface defect monitoring system of FIG. 1, according to a preferred embodiment of the present invention.

FIG. 8B is a top plan view illustrating an exemplary embodiment of an image of another pavement defect 704 of FIG. 7 produced by the surface defect monitoring system 100 of FIG. 1, according to a preferred embodiment of the present invention. Cracking on, under, and extending from an asphalt patch indicates an evolving problem to be flagged to the history analysis facility 118.

Figure 9:
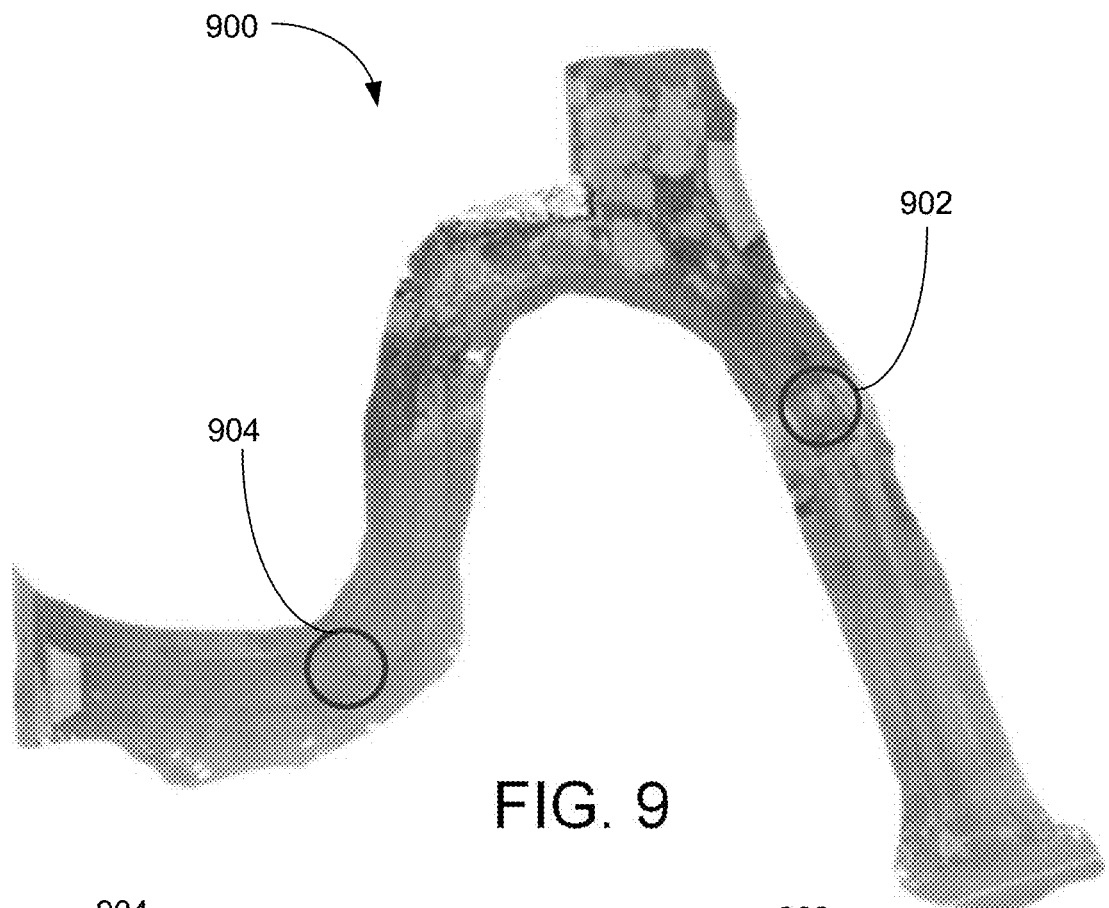
FIG. 9 is a top plan view illustrating an exemplary embodiment of an image of a driveway, with a zoom-in view of two representative pavement distress/flaws, said image produced by the surface defect monitoring system of FIG. 1, according to a preferred embodiment of the present invention.

FIG. 9 is a top plan view illustrating an exemplary embodiment of an alternatively-sourced image 900 of a driveway having two pavement anomalies 902 and 904, said image produced by the surface defect monitoring system of FIG. 1, according to a preferred embodiment of the present invention. Pavement defect 902 is a pothole. Pavement defect 904 is a transverse crack.

Figure 10:
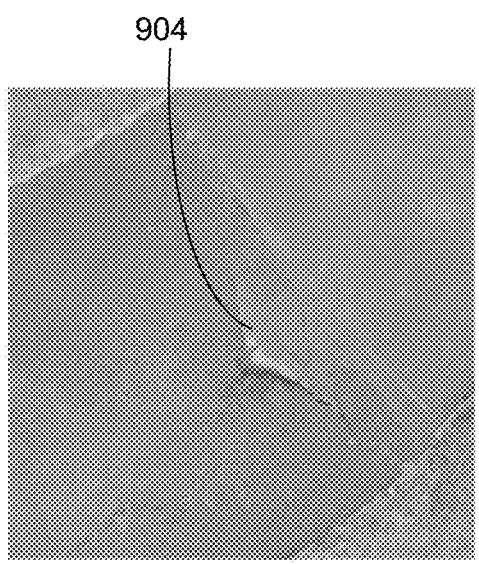
FIG. 10 is a top plan view illustrating an exemplary embodiment a zoomed-in image of a pavement distress/flaw identified by the surface defect monitoring system of FIG. 1, according to a preferred embodiment of the present invention.

FIG. 10 is a top plan view illustrating an exemplary embodiment of a detailed alternatively-sourced image of a pavement anomaly 904 of FIG. 9, produced by the surface defect monitoring system 100 of FIG. 1, according to a preferred embodiment of the present invention. Pavement defect 904 can be more easily seen to be a transverse crack.

Figure 11:
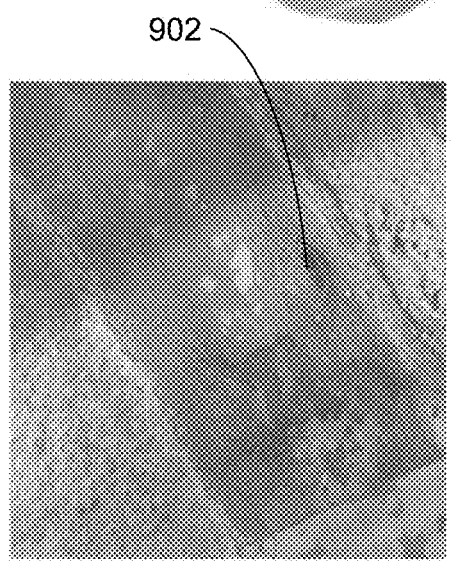
FIG. 11 is a top plan view illustrating an exemplary embodiment of zoomed-in image of another pavement distress/flaw identified by the surface defect monitoring system of FIG. 1, according to a preferred embodiment of the present invention.

FIG. 11 is a top plan view illustrating an exemplary embodiment of an alternatively-sourced image of another pavement anomaly 902 produced by the surface defect monitoring system 100 of FIG. 1, according to a preferred embodiment of the present invention. Pavement defect 902 can be more easily seen to be a pothole.

FIG. 12A is a partial screen shot view illustrating an exemplary embodiment of an output 1200 of the exemplary defect detection and analysis facility 120, as produced by the surface defect monitoring system 100 of FIG. 1, according to a preferred embodiment of the present invention. FIG. 12A is not to scale: the right-hand portion, shown in FIG. 12B, has been expanded vertically to make it readable in this document. Various defects are identified by color-coded polygons 1202 (one of fourteen labeled) and described in windows 1204 (one of six labeled) having backgrounds of corresponding colors as shown in FIG. 12B. The polygons 1202 are produced by the artificial intelligence engine of the defect detection and analysis facility 120 and superimposed on a photomosaic 1206. The artificial intelligence engine of the defect detection and analysis facility 120 is capable of learning new types of defects, either by being given an example or by internal observation of anomalous conditions. FIG. 12B is a screen shot view illustrating an exemplary embodiment of the output of the exemplary defect detection and analysis facility, as produced by the surface defect monitoring system of FIG. 1, and corresponding in color to the polygons in FIG. 12A, according to a preferred embodiment of the present invention. On the same computer screen as FIG. 12A, the windows 1204 (one of six labeled) provide descriptive information regarding the defects delineated by the polygons in FIG. 12A. The background color in each window 1204 (one of six labeled) corresponds with the color of the polygon shown in FIG. 12A.

Figure 13:
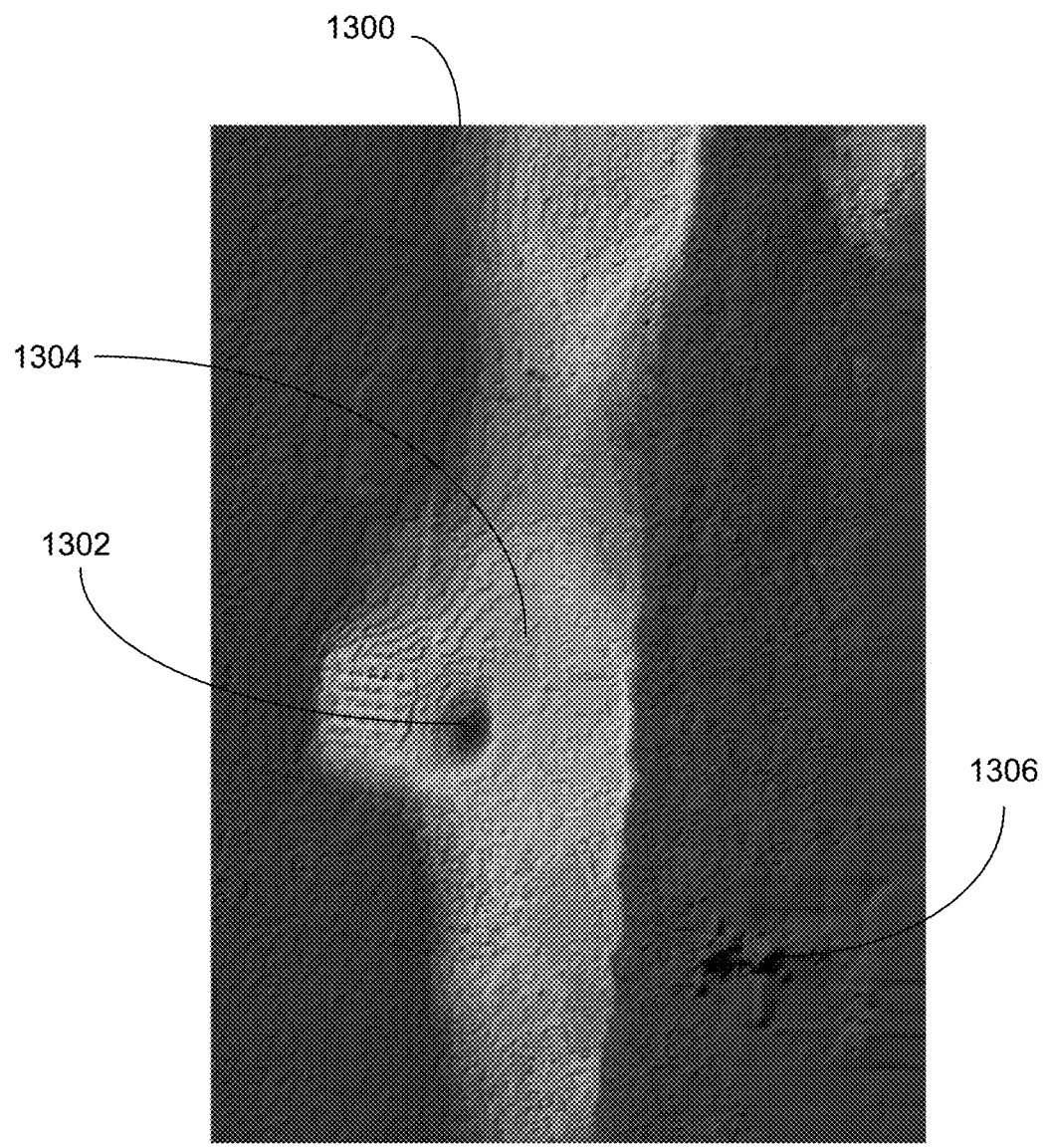
FIG. 13 is a top plan view illustrating an exemplary embodiment of a digital surface/terrain map of a pothole as produced by the surface defect monitoring system of FIG. 1, according to a preferred embodiment of the present invention.

FIG. 13 is a top plan view illustrating an exemplary embodiment of a digital surface and terrain map 1300 of a pothole 1302 as produced by the surface defect monitoring system 100 of FIG. 1, according to a preferred embodiment of the present invention. The digital surface and terrain map 1300 is a particular digital surface and terrain map 116 and is colorized in spectral order, with the deepest portion 1302 being blue, intermediate level 1304 colored green, and the highest elevation 1306 colored red.

Figure 14A:
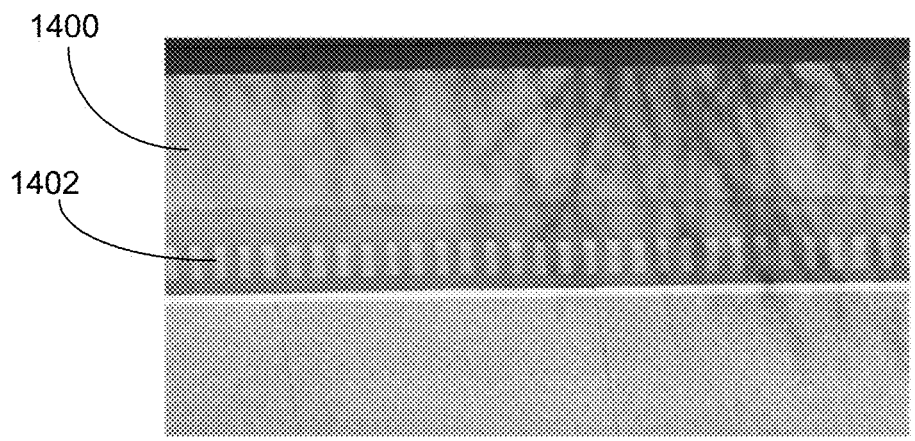
FIG. 14A is a top plan view illustrating an exemplary embodiment of a a digital surface/terrain map of rumble bars as produced by the surface defect monitoring system of FIG. 1, according to a preferred embodiment of the present invention.

FIG. 14A is a top plan view illustrating an exemplary embodiment of an orthomosaic image 1400 of rumble bars 1402 as produced by the surface defect monitoring system 100 of FIG. 1, according to a preferred embodiment of the present invention. Shadows from adjacent plant life can be seen.

Figure 14B:
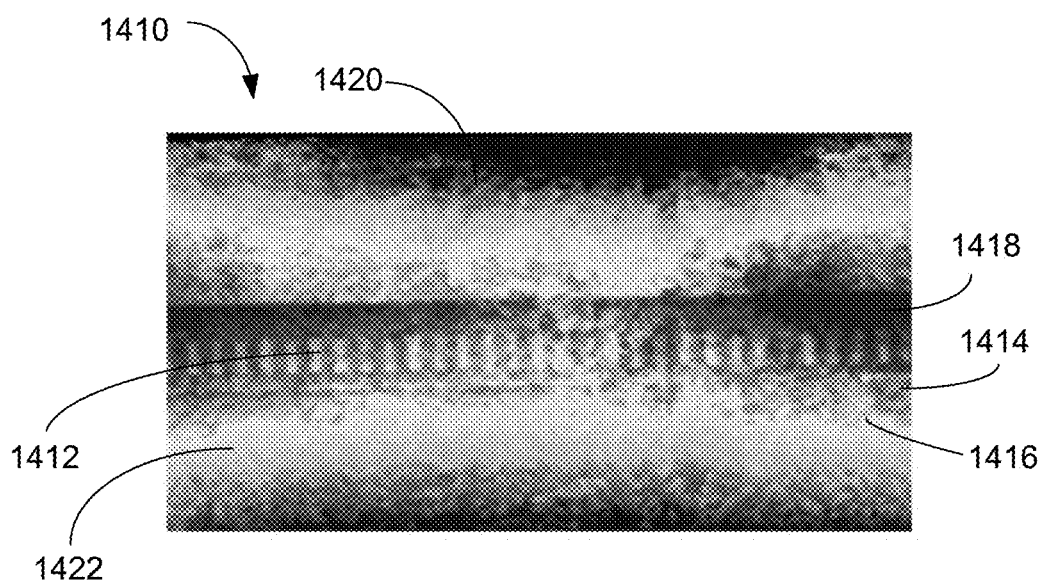
FIG. 14B is a top plan view illustrating an exemplary embodiment of a digital surface/terrain map of the rumble bars of FIG. 14A, as produced by the surface defect monitoring system of FIG. 1, according to a preferred embodiment of the present invention.

FIG. 14B is a top plan view illustrating an exemplary embodiment of a digital surface/terrain map 1410 of the rumble bars 1402 of FIG. 14A, as produced by the surface defect monitoring system 100 of FIG. 1, according to a preferred embodiment of the present invention. The image is spectral color coded with dark red 1418 being the highest elevation, orange 1414 being lower, yellow 1416 being yet lower, light blue 1422 yet even lower, and dark blue 1420 the lowest elevation. Rumble bar elevations 1412 are red with yellow sockets in between. The 3D image 1410 conveys more information than the two-dimensional orthomosaic image 1400.

Those of skill in the art, enlightened by the present disclosure, will be aware that the present invention can be extended for all types of traversable terrain.

The following claims contain some functional claiming and do not contain any statements of intended use.

We claim:

1. A surface defect monitoring system comprising:
   a. a high-resolution camera attachable to a land vehicle and oriented to photograph pavement;
   b. a database operable to receive, store, and retrieve images and video data produced by said high-resolution camera;
   c. an image processing facility operable to retrieve said images and video data from said database and to produce metadata-stamped orthomosaics, 3D imagery, and digital surface and terrain maps;
   d. a defect detection and analysis facility comprising an artificial intelligence engine operable to:
      i. receive:
         1) said digital surface and terrain maps;
         2) said metadata-stamped orthomosaics; and
         3) imagery and video data from alternative sources;
      ii. analyze said metadata-stamped orthomosaics, said alternatively-sourced imagery, and said digital surface and terrain maps for pavement surface defects;
      iii. detect various kinds of defects in the pavement surface responsive to said analysis; and
      iv. superimpose upon said metadata-stamped orthomosaics respective various indicators of said defects.

2. The surface defect monitoring system of claim 1, comprising a history analysis facility operable to:
   a. compare a plurality of metadata-stamped orthomosaics having various sequential time stamps to identify evolving pavement defects; and
   b. analyze said identified evolving pavement defects with an artificial intelligence engine to predict degradation and evolving maintenance requirements.

3. The surface defect monitoring system of claim 1, wherein said defect detection and analysis facility is also operable to analyze imagery collected from sources other than land vehicles.

4. The surface defect monitoring system of claim 1, wherein said high-resolution camera has a resolution in the range of one centimeter per pixel to less than one millimeter per pixel.

5. The surface defect monitoring system of claim 1, wherein said digital surface and terrain maps are created from the same images as said orthomosaics.

6. The surface defect monitoring system of claim 1, wherein said three-dimensional images are created from the same images as said orthomosaics.

7. The surface defect monitoring system of claim 6, wherein said three-dimensional images are color-coded by depth.

8. The surface defect monitoring system of claim 1, wherein said indicators of said defects comprise at least one of colored shaded areas around said defect images and perimeters surrounding said defect images.

9. The surface defect monitoring system of claim 8, wherein said defect detection and analysis facility is operable to provide said superimposed metadata-stamped orthomosaics in a graphic user interface.

10. The surface defect monitoring system of claim 9, wherein said graphic user interface comprises windows containing descriptions of said defects, wherein said windows have background colors corresponding to at least one respective said perimeter colors and said shading colors.

11. A surface defect monitoring system comprising:
   a. a high-resolution camera attachable to a land vehicle and oriented to photograph pavement;
   b. a database operable to receive, store, and retrieve images and video data produced by said high-resolution camera;
   c. an image processing facility operable to retrieve said images and video data from said database and to produce metadata-stamped orthomosaics;
   d. a defect detection and analysis facility comprising an artificial intelligence engine operable to:
      i. receive:
         1) digital surface and terrain maps;
         2) said metadata-stamped orthomosaics; and
         3) imagery and video data from alternative sources;
      ii. analyze said metadata-stamped orthomosaics and said digital surface and terrain maps for pavement surface defects;
      iii. detect various kinds of defects in the pavement surface responsive to said analysis; and
      iv. superimpose upon said metadata-stamped orthomosaics respective various indicators of said defects;
   e. a history analysis facility operable to:
      i. compare a plurality of metadata-stamped orthomosaics having various sequential time stamps to identify evolving pavement defects; and
      ii. analyze said identified evolving pavement defects with an artificial intelligence engine to predict life, degradation, and optimum/evolving maintenance approach.

12. The surface defect monitoring system of claim 11, wherein said defect detection and analysis facility is operable to analyze said alternately sourced imagery.

13. The surface defect monitoring system of claim 11, wherein said images used to form said metadata-stamped orthomosaics also:
   a. produce said digital surface and terrain maps;
   b. create said three-dimensional images; and
   c. wherein said digital surface and terrain maps are color-coded by depth.

14. The surface defect monitoring system of claim 11, wherein said defect detection and analysis facility is operable to analyze said alternatively sourced imagery.

15. The surface defect monitoring system of claim 11, wherein said indicators of said defects comprise at least one of colored perimeters surrounding said defect images and colored shading around said defect images.

16. The surface defect monitoring system of claim 15, wherein:
- a. said defect detection and analysis facility is operable to provide said superimposed metadata-stamped orthomosaics in a graphic user interface; and
- b. said graphic user interface comprises windows containing descriptions of said defects, said windows having background colors corresponding to at least one of respective area shading, fill, and perimeter colors.

17. A surface defect monitoring system comprising:
- a. a high-resolution camera attachable to a land vehicle and oriented to photograph pavement;
- b. a database operable to receive, store, and retrieve images and video data produced by said high-resolution camera;
- c. an image processing facility operable to retrieve said images and video data from said database and to produce metadata-stamped orthomosaics;
- d. a defect detection and analysis facility comprising an artificial intelligence engine operable to:
  - i. receive:
    - 1) digital surface and terrain maps;
    - 2) said metadata-stamped orthomosaics; and
    - 3) imagery and video data from alternative sources;
  - ii. analyze said metadata-stamped orthomosaics and said digital surface and terrain maps for pavement surface defects;
  - iii. detect various kinds of defects in the pavement surface responsive to said analysis;
  - iv. superimpose upon said metadata-stamped orthomosaics respective various indicators of said defects; and
  - v. analyze said alternatively-sourced imagery;
- e. a history analysis facility operable to:
  - i. compare a plurality of metadata-stamped orthomosaics having various sequential time stamps to identify evolving pavement defects; and
  - ii. analyze said identified evolving pavement defects with an artificial intelligence engine to predict degradation and evolving maintenance requirements.

18. The surface defect monitoring system of claim 17, wherein said metadata-stamped orthomosaics:
- a. produce said digital surface and terrain maps;
- b. comprise three-dimensional images; and
- c. wherein said digital surface and terrain maps are color-coded by depth.

19. The surface defect monitoring system of claim 17, wherein said defect detection and analysis facility is also operable to analyze said alternatively sourced imagery.

20. The surface defect monitoring system of claim 17, wherein:
- a. said indicators of said defects comprise one of area shading, fill, and colored perimeters surrounding said defect images;
- b. said defect detection and analysis facility is operable to provide said superimposed metadata-stamped orthomosaics in a graphic user interface; and
- c. said graphic user interface comprises windows containing descriptions of said defects, said windows having background colors corresponding to at least one of area said shading, fill, and perimeter colors.

* * * * *